United States Patent
Wakayama et al.

(10) Patent No.: US 7,808,729 B2
(45) Date of Patent: Oct. 5, 2010

(54) DRIVING DEVICE

(75) Inventors: Tomihiro Wakayama, Saitama (JP); Chiraru Katagiri, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 175 days.

(21) Appl. No.: 12/292,266

(22) Filed: Nov. 14, 2008

(65) Prior Publication Data

US 2009/0128933 A1    May 21, 2009

(30) Foreign Application Priority Data

Nov. 15, 2007    (JP) .............................. 2007-296226

(51) Int. Cl.
*G02B 7/02*    (2006.01)
(52) U.S. Cl. .................... 359/823; 359/822; 359/824
(58) Field of Classification Search .................. 359/823
See application file for complete search history.

(56) References Cited

U.S. PATENT DOCUMENTS

| | | | |
|---|---|---|---|
| 5,225,941 A | 7/1993 | Saito et al. | |
| 5,589,723 A | 12/1996 | Yoshida et al. | |
| 2005/0275315 A1* | 12/2005 | Manabe et al. | 310/328 |
| 2007/0019308 A1* | 1/2007 | Tomita | 359/824 |

FOREIGN PATENT DOCUMENTS

JP    7-274544    10/1995

* cited by examiner

*Primary Examiner*—Jordan M. Schwartz
*Assistant Examiner*—James C Jones
(74) *Attorney, Agent, or Firm*—Wenderoth, Lind & Ponack, L.L.P.

(57) ABSTRACT

A driving device includes a piezoelectric element that expands and contracts by the application of voltage, a driving shaft fixed to one end of the piezoelectric element in a direction of the optical axis, a lens holder fixed to the other end of the piezoelectric element in the direction of the optical axis, a friction portion frictionally engaged with the driving shaft, and a base that supports the driving shaft such that the driving shaft is capable of moving along the optical axis. The friction portion includes a receiving portion and a leaf spring that are arranged in a manner such that the driving shaft extending along the optical axis is clamped therebetween in the radial direction.

7 Claims, 4 Drawing Sheets

DRIVING DEVICE

BACKGROUND OF THE INVENTION

1. Field of the Invention

The present invention relates to a driving device that uses an electromechanical transducer as a driving source.

2. Description of the Related Art

As a technique of this field, Japanese Unexamined Patent Application Publication No. 7-274544 discloses a driving device that includes a driving shaft (non-deforming portion) fixed to one end of a piezoelectric element, and a lens barrel (driven portion) frictionally engaged with the driving shaft by a pressure spring (friction portion) and a friction plate. When pulsed voltage is applied to the piezoelectric element, the piezoelectric element expands and contracts, and the driving shaft is displaced, thus moving the lens barrel frictionally engaged with the driving shaft.

However, in the above-described driving device as the related art, the pressure spring and the friction plate are fixed to the lens barrel, and therefore, vibration resulting from friction caused between the pressure spring and the friction plate, and the lens barrel is directly transmitted to the lens barrel. This vibration due to friction has a great influence on the lens barrel, and causes deviation of the optical axis.

SUMMARY OF THE INVENTION

Accordingly, it is an object of the present invention to provide a driving device that can minimize the influence of vibration due to friction on a driven portion.

A driving device according to an aspect of the present invention includes an electromechanical transducer configured to expand and contract by the application of voltage; a rod-shaped non-deforming portion fixed to one end of the electromechanical transducer in an expanding and contracting direction of the electromechanical transducer; a driven portion fixed to the other end of the electromechanical transducer in the expanding and contracting direction; a friction portion frictionally engaged with the non-deforming portion; and a base to which the friction portion is fixed, the base supporting the non-deforming portion such that the non-deforming portion is capable of moving in the expanding and contracting direction.

In the driving device according to the aspect of the present invention, the non-deforming portion and the driven portion are respectively provided on one side and the other side of the electromechanical transducer in the expanding and contracting direction of the electromechanical transducer, and the friction portion is provided close to the non-deforming portion and is fixed to the base. Therefore, it is possible to prevent vibration due to friction caused between the friction portion and the non-deforming portion from being directly transmitted to the driven portion, and to thereby minimize the influence of the vibration due to friction on the driven portion.

Preferably, the driven portion is a lens holder, a lens shutter unit, or a lens diaphragm unit.

In this case, since wires of the electromechanical transducer and wires of the unit can be easily bundled, wiring of the entire device is simplified.

Preferably, the friction portion includes a receiving portion having a groove defined by a V-shaped inner wall surface and a leaf spring having a V-shaped inner wall surface, the non-deforming portion is clamped between the inner wall surface of the receiving portion and the inner wall surface of the leaf spring, and the inner wall surface of the receiving portion and the inner wall surface of the leaf spring are in linear contact with an outer peripheral surface of the non-deforming portion.

In this case, the non-deforming portion is in contact with the inner wall surface of the groove of the receiving portion, and is pressed against a bottom face of the groove by the leaf spring. With this structure, stable frictional engagement of the friction portion with the non-deforming portion is achieved. Further, since the inner wall surface of the receiving portion and the inner wall surface of the leaf spring are in linear contact with the outer peripheral surface of the non-deforming portion, it is possible to ensure a sufficient frictional force to frictionally engage the friction portion and the non-deforming portion, and to reduce contact friction between the friction portion and the non-deforming portion. This allows the driven portion to reciprocate smoothly.

The driving device may further include a guide portion configured to regulate rotation of the driven portion, and located in parallel with the expanding and contracting direction of the electromechanical transducer.

In this case, the driven portion can be smoothly moved in the expanding and contracting direction of the electromechanical transducer.

The present invention can provide a driving device that can minimize the influence of vibration due to friction on a driven portion.

DESCRIPTION OF THE PREFERRED EMBODIMENTS

Driving devices according to preferred embodiments of the present invention will now be described in detail below with reference to the drawings.

First Embodiment

Figure 1:
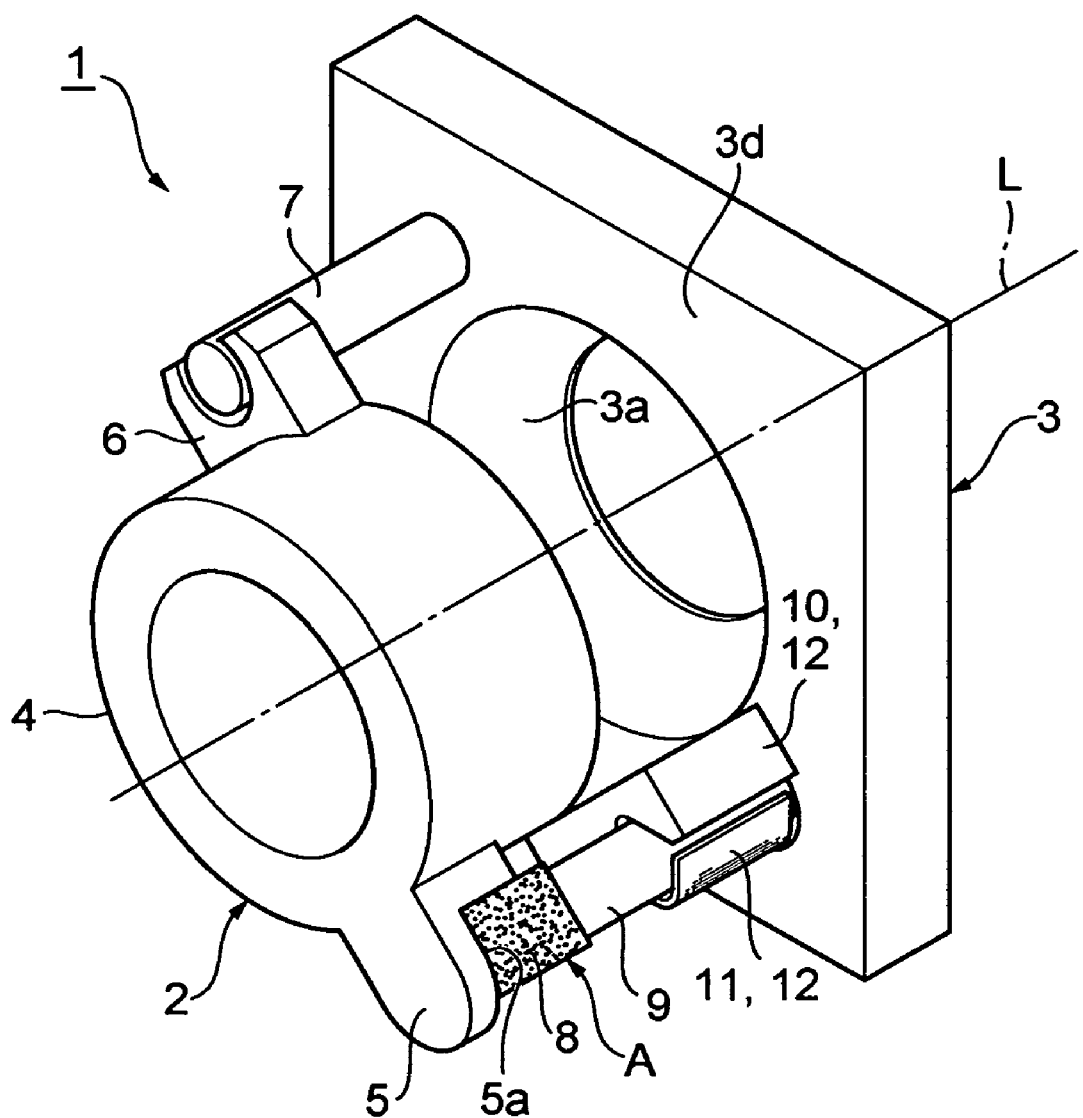
FIG. 1 is a perspective view of a driving device according to a first embodiment of the present invention.
Figure 2:
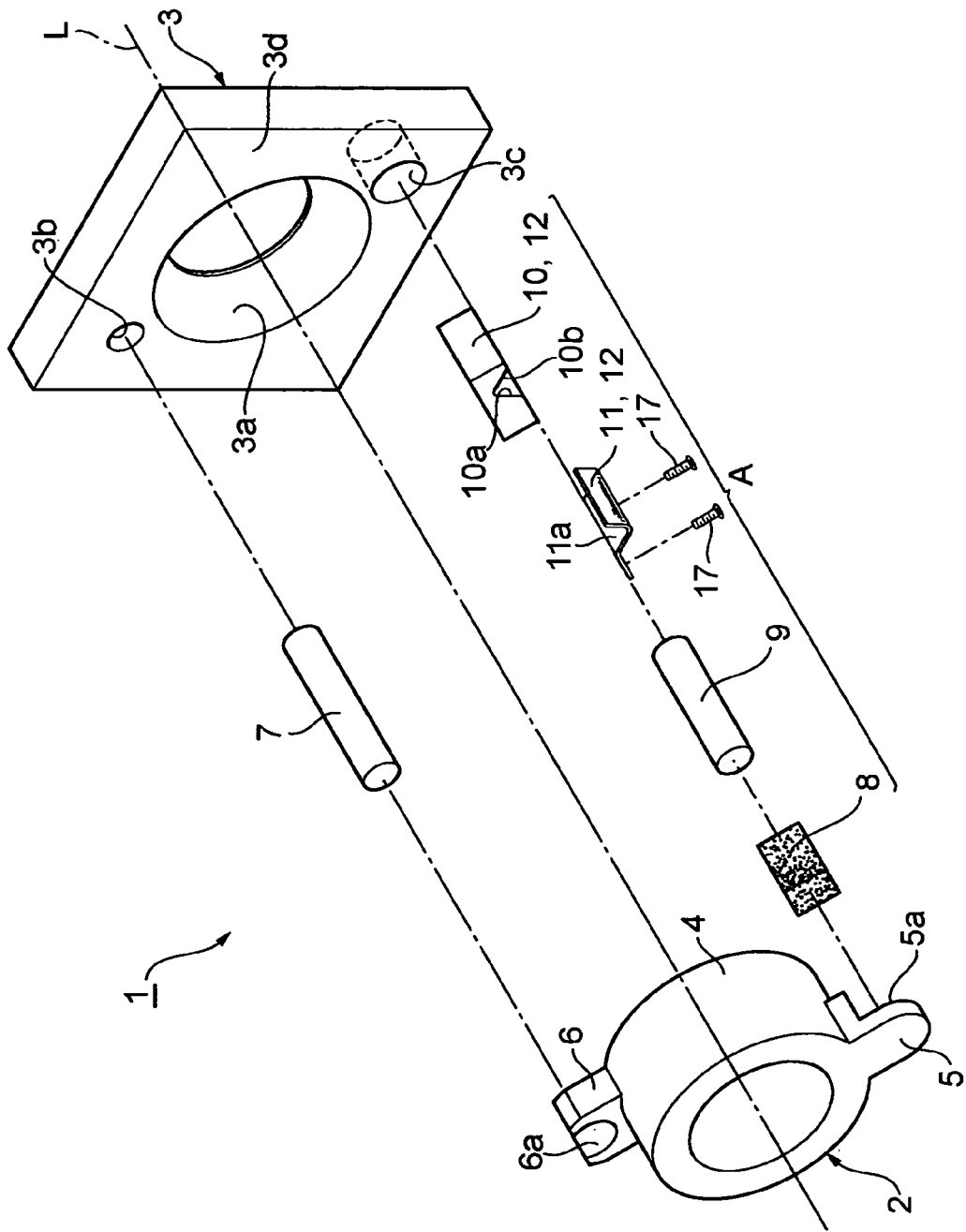
FIG. 2 is an exploded perspective view of the driving device shown in FIG. 1.

A driving device 1 according to a first embodiment is adopted in an optical apparatus, such as a digital camera, a video camera, or a digital camera installed in a mobile telephone, so as to perform AF (Auto-Focus) control. Referring to FIGS. 1 and 2, the driving device 1 mainly includes a lens holder (driven portion) 2 for holding a lens (not shown), a base 3 facing the lens holder 2 in the direction of the optical axis L of the lens, and a driving unit A for causing the lens holder 2 to reciprocate in the front-rear direction along the optical axis L. The driving unit A includes a piezoelectric element (electromechanical transducer) 8 that expands and contracts along the optical axis L by the application of voltage, a driving shaft (non-deforming portion) 9 fixed to one end of the piezoelectric element 8 in the expanding and contracting direction (that is, the direction of the optical axis L), and a friction portion 12 frictionally engaged with the driving shaft 9.

The lens holder 2 includes a cylindrical portion 4 that holds a lens for forming an optical image of an object. A flange portion 5 is provided on an outer peripheral surface of the cylindrical portion 4 in a manner such as to be in contact with the piezoelectric element 8. The flange portion 5 protrudes in the radial direction from the outer peripheral surface of the cylindrical portion 4, and a flat rear end face 5a of the flange portion 5 is in contact with a front end of the piezoelectric element 8. An engaging portion 6 is provided on the cylindrical portion 4 at a phase angle of 180° from the flange portion 5. The engaging portion 6 is engaged with a guide shaft (guide portion) 7 extending along the optical axis L. The engaging portion 6 protrudes in the radial direction from the outer peripheral surface of the cylindrical portion 4, and has, at a leading end thereof, a U-shaped groove 6a in which the guide shaft 7 is fitted. The guide shaft 7 is fitted in the groove 6a so as to regulate rotation of the lens holder 2. This allows the lens holder 2 to be smoothly moved along the optical axis L.

The base 3 is shaped like a flat plate, and is provided behind the lens holder 2 in the direction of the optical axis L. A light entrance window 3a, which is shaped like a circle centered on the optical axis L, is provided in the center of the base 3. Thus, light from the object enters the lens along the optical axis L, and forms an optical image by the lens. The optical image is captured by an image pickup element (not shown) through the light entrance window 3a. As shown in FIG. 2, the base 3 also has an insertion hole 3b in which the guide shaft 7 is fitted. The guide shaft 7 is fixed to the base 3 by being fitted in the insertion hole 3b. A through hole 3c through which the driving shaft 9 extends is provided on a side of the light entrance window 3a opposite the insertion hole 3b. The diameter of the through hole 3c is larger than the outer diameter of the driving shaft 9 so that the driving shaft 9 can freely move therethrough. The driving shaft 9 is supported by a friction portion 12 serving as a part of the base 3 in a manner such as to move along the optical axis L.

As the piezoelectric element 8, for example, a piezoelectric actuator capable of extremely fine driving can be adopted. The front end of the piezoelectric actuator 8 is in contact with the rear end face 5a of the flange portion 5, and is fixed to the lens holder 2 with an adhesive. A rear end of the piezoelectric actuator 8 is fixed to a front end of the driving shaft 9 with an adhesive. The driving shaft 9 is shaped like a cylinder made of sintered carbon, and extends along the optical axis L.

The friction portion 12 includes a receiving portion 10 and a leaf spring 11 that are arranged so that the driving shaft 9 extending along the optical axis L is clamped therebetween in the radial direction. The friction portion 12 is frictionally engaged with the driving shaft 9. As shown in FIG. 2, the receiving portion 10 has a groove 10b defined by a V-shaped inner wall surface 10a. The leaf spring 11 is shaped by bending one flat plate in a V-form, and has a V-shaped inner wall surface 11a. The driving shaft 9 is clamped in the radial direction between the inner wall surface 10a of the receiving portion 10 and the inner wall surface 11a of the leaf spring 11. The inner surface 10a of the receiving portion 10 and the inner surface 11a of the leaf spring 11 are in linear contact with an outer peripheral surface of the driving shaft 9. The receiving portion 10 is in contact with a front surface 3d of the base 3, and is fixed to the base 3 with an adhesive. The leaf spring 11 is fixed to the receiving portion 10 by screws 17.

Operation of the driving device 1 will be described below. When pulsed voltage is applied to the piezoelectric element 8, the piezoelectric element 8 repeatedly expands and contracts. More specifically, when a pulsed voltage having a low voltage-increase rate and a high voltage-decrease rate is applied, the piezoelectric element 8 expands slowly and contracts quickly. Since the driving shaft 9 is frictionally engaged with the friction portion 12 and the friction portion 12 is fixed to the base 3, when a pulsed voltage having a low voltage-increase rate is applied to the piezoelectric element 8, the lens holder 2 fixed to the piezoelectric element 8 via the flange portion 5 slowly moves forward along the optical axis L. When a pulsed voltage having a high voltage-decrease rate is applied, the lens holder 2 does not move because of the force of inertia.

When the application of such a pulsed voltage having a low voltage-increase rate and a high voltage-decrease rate is repeated, the driving shaft 9, the piezoelectric element 8 fixed to the front end of the driving shaft 9, and the lens holder 2 fixed to the piezoelectric element 8 via the flange portion 5 move forward together along the optical axis L.

In contrast, when a voltage having a high voltage-increase rate and a low voltage-decrease rate is applied, the piezoelectric element 8 expands quickly and contracts slowly. With this, since the driving shaft 9 is frictionally engaged with the friction portion 12 and the friction portion 12 is fixed to the base 3, when a pulsed voltage having a high voltage-increase rate is applied to the piezoelectric element 8, the lens holder 2 fixed to the piezoelectric element 8 via the flange portion 5 does not move because of the force of inertia. When a pulsed voltage having a low voltage-decrease rate is applied, the lens holder 2 slowly moves rearward along the optical axis L.

When the application of such a pulsed voltage having a high voltage-increase rate and a low voltage-decrease rate is repeated, the driving shaft 9, the piezoelectric element 8 fixed to the front end of the driving shaft 9, and the lens holder 2 fixed to the piezoelectric element 8 via the flange portion 5 move rearward together along the optical axis L.

In the driving device 1 having the above-described configuration, the lens holder 2 and the driving shaft 9 are provided at one end and the other end of the piezoelectric element 8, respectively, and the friction portion 12 is provided close to the driving shaft 9 and is fixed to the base 3. Hence, it is possible to prevent vibration due to friction between the friction portion 12 and the driving shaft 9 from being directly transmitted to the lens holder 2, and to minimize the influence of the vibration due to friction on the lens holder 2.

Further, the friction portion 12 is constituted by the receiving portion 10 and the leaf spring 11 that are arranged so that the driving shaft 9 extending along the optical axis L is provided therebetween in the radial direction, and the driving shaft 9 is clamped between the inner wall surface 10a of the receiving portion 10 and the inner wall surface 11a of the leaf spring 11. Since the driving shaft 9 is in contact with the inner wall surface of the groove 10b of the receiving portion 10 and is pressed against a bottom face of the groove 10b by the leaf spring 11, stable frictional engagement between the friction portion 12 and the driving shaft 9 is achieved. In addition, since the inner wall surface 10a of the receiving portion 10 and the inner wall surface 11a of the leaf spring 11 are in linear contact with the outer peripheral surface of the driving shaft 9, it is possible to ensure a sufficient frictional force to frictionally engage the friction portion 12 and the driving shaft 9. Moreover, since the contact friction between the friction portion 12 and the driving shaft 9 is reduced, the lens holder 2 can smoothly reciprocate in the front-rear direction.

Second Embodiment

Figure 3:
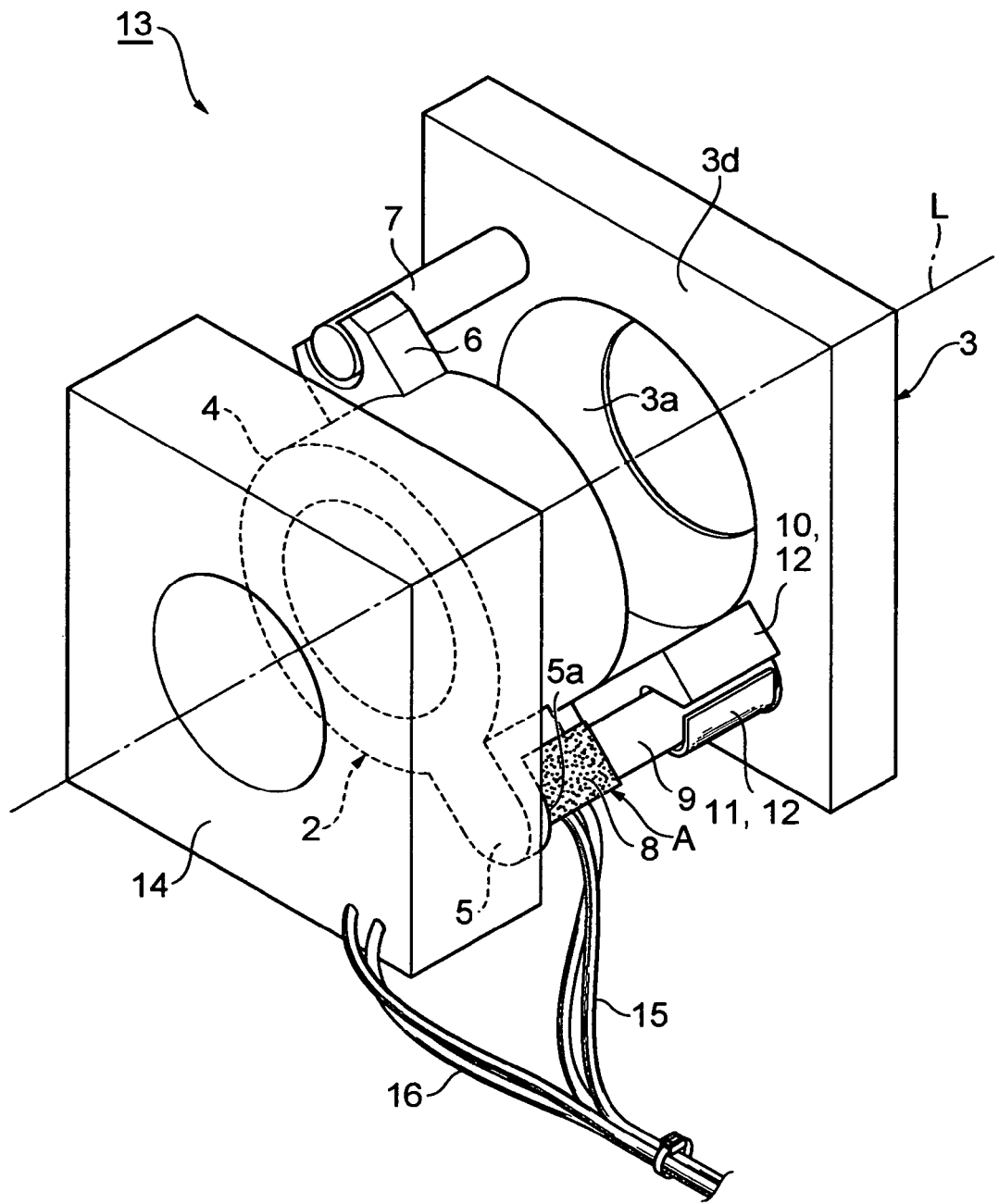
FIG. 3 is a perspective view of a driving device according to a second embodiment.
Figure 4:
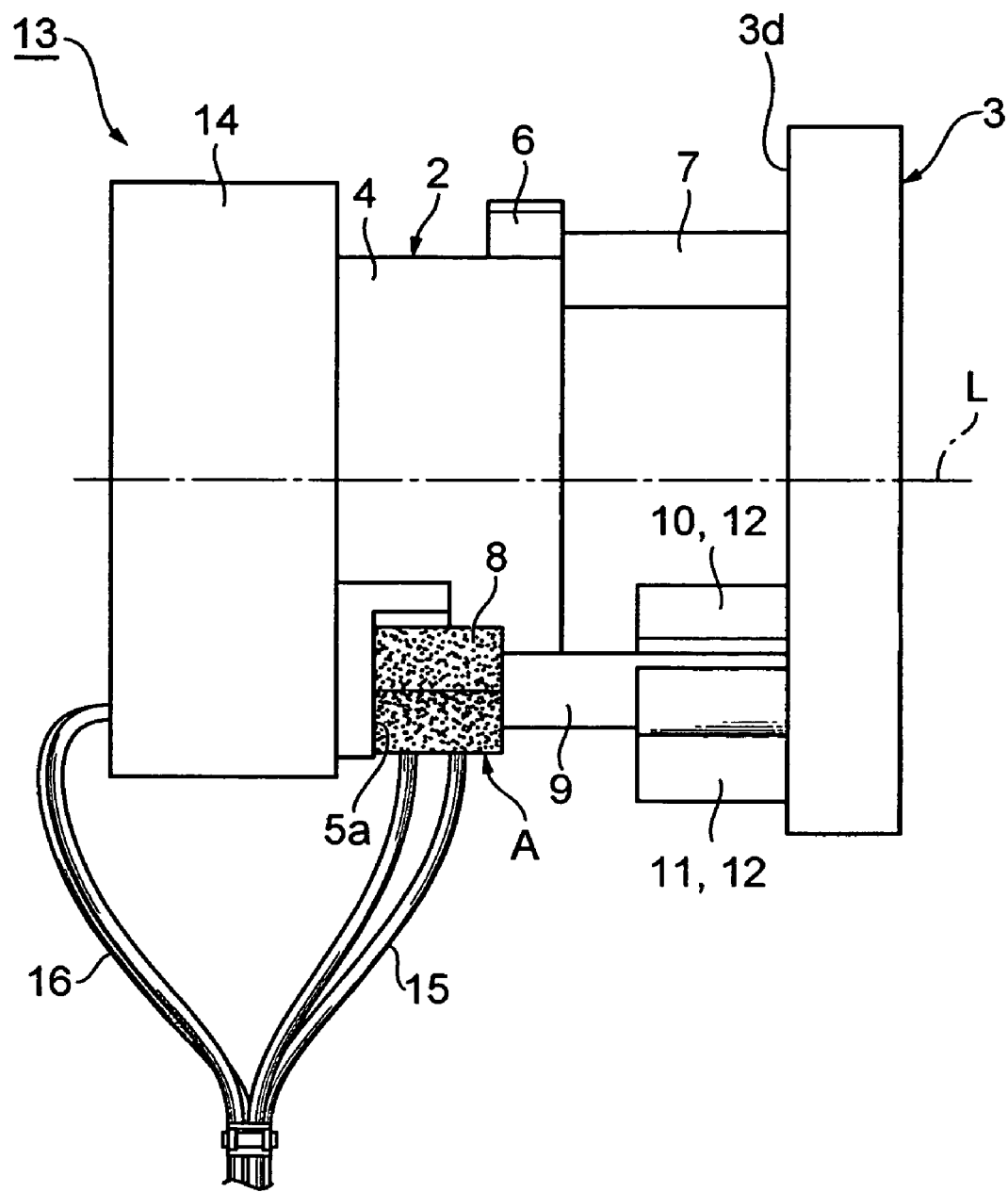
FIG. 4 is a plan view of the driving device shown in FIG. 3.

Referring to FIGS. 3 and 4, a driving device 13 according to a second embodiment is different from the driving device 1 of the first embodiment in that a driven portion includes a lens holder 2 and a diaphragm unit 14. Since other structures are equivalent to those adopted in the driving device 1, they are denoted by the same reference numerals, and redundant descriptions thereof are omitted.

The diaphragm unit 14 is provided at a front end of the lens holder 2, and is fixed to the lens holder 2 with an adhesive.

Wires 16 of the diaphragm unit 14 and wires 15 of a piezoelectric element 8 are bundled near the piezoelectric element 8.

With this configuration, the driving device 13 can provide advantages similar to those of the first embodiment. Moreover, since the diaphragm unit 14 is provided near the piezoelectric element 8, the wires 16 of the diaphragm unit and the wires 15 of the piezoelectric element 8 can be bundled easily. This simplifies wiring of the entire device.

The present invention is not limited to the above-described embodiments. For example, the driven portion of the driving device may include a lens holder and a shutter unit.

What is claimed is:

1. A driving device comprising:
   an electromechanical transducer configured to expand and contract by the application of voltage;
   a rod-shaped non-deforming portion fixed to one end of the electromechanical transducer in an expanding and contracting direction of the electromechanical transducer;
   a driven portion fixed to the other end of the electromechanical transducer in the expanding and contracting direction;
   a friction portion frictionally engaged with the non-deforming portion; and
   a base to which the friction portion is fixed, the base supporting the non-deforming portion such that the non-deforming portion is capable of moving in the expanding and contracting direction.

2. The driving device according to claim 1, wherein the driven portion is a lens holder, a lens shutter unit, or a lens diaphragm unit.

3. The driving device according to claim 2,
   wherein the friction portion includes a receiving portion having a groove defined by a V-shaped inner wall surface, and a leaf spring having a V-shaped inner wall surface, and
   wherein the non-deforming portion is clamped between the inner wall surface of the receiving portion and the inner wall surface of the leaf spring, and the inner wall surface of the receiving portion and the inner wall surface of the leaf spring are in linear contact with an outer peripheral surface of the non-deforming portion.

4. The driving device according to claim 3, further comprising:
   a guide portion configured to regulate rotation of the driven portion, the guide portion being located in parallel with the expanding and contracting direction of the electromechanical transducer.

5. The driving device according to claim 1,
   wherein the friction portion includes a receiving portion having a groove defined by a V-shaped inner wall surface, and a leaf spring having a V-shaped inner wall surface, and
   wherein the non-deforming portion is clamped between the inner wall surface of the receiving portion and the inner wall surface of the leaf spring, and the inner wall surface of the receiving portion and the inner wall surface of the leaf spring are in linear contact with an outer peripheral surface of the non-deforming portion.

6. The driving device according to claim 1, further comprising:
   a guide portion configured to regulate rotation of the driven portion, the guide portion being located in parallel with the expanding and contracting direction of the electromechanical transducer.

7. The driving device according to claim 2, further comprising:
   a guide portion configured to regulate rotation of the driven portion, the guide portion being located in parallel with the expanding and contracting direction of the electromechanical transducer.

* * * * *